(12) United States Patent
Schmidt et al.

(10) Patent No.: US 7,562,764 B2
(45) Date of Patent: Jul. 21, 2009

(54) ENTRY CONVEYOR AND PAN SECTION FOR THE SAME

(75) Inventors: Siegfrid Schmidt, Bottrop (DE); Gerhard Merten, Lünen (DE); Hans Meya, Werne (DE); Jörg Wirtz, Witten (DE); Ingo Pruss, Wuppertal (DE); Karl-Heinz Schürer, Herne (DE); Reinhold Brüggemann, Dortmünd (DE); Kauu Brüggemann, legal representative, Dortmünd (DE)

(73) Assignee: DBT GmbH (DE)

( * ) Notice: Subject to any disclaimer, the term of this patent is extended or adjusted under 35 U.S.C. 154(b) by 45 days.

(21) Appl. No.: 11/755,184

(22) Filed: May 30, 2007

(65) Prior Publication Data

US 2008/0041693 A1    Feb. 21, 2008

(30) Foreign Application Priority Data

May 30, 2006    (DE) .................. 10 2006 025 517

(51) Int. Cl.
*B65G 19/08* (2006.01)
(52) U.S. Cl. .................. 198/735.6; 198/861.2
(58) Field of Classification Search ............. 198/735.6, 198/861.2
See application file for complete search history.

(56) References Cited

U.S. PATENT DOCUMENTS

| | | | | |
|---|---|---|---|---|
| 2,512,610 A | * | 6/1950 | Cartlidge ................ | 198/861.2 |
| 4,742,904 A | * | 5/1988 | Miller ..................... | 198/735.6 |
| 5,033,605 A | * | 7/1991 | Marquart .................. | 198/300 |
| 5,096,048 A | * | 3/1992 | Lachner et al. ............. | 198/733 |
| 5,156,258 A | * | 10/1992 | Steinkuhl et al. ......... | 198/735.6 |
| 5,161,858 A | * | 11/1992 | Braun et al. .................. | 299/43 |

FOREIGN PATENT DOCUMENTS

| | | |
|---|---|---|
| DE | 1 024 880 | 2/1958 |
| DE | 1 275 023 | 8/1968 |
| DE | 20 2004 004 652 U1 | 1/2004 |

\* cited by examiner

*Primary Examiner*—Mark A Deuble
(74) *Attorney, Agent, or Firm*—Baker & McKenzie LLP

(57) ABSTRACT

An entry conveyor including a conveyor pan formed by a plurality of pan sections that are hingeably connected to each other, at the two ends of which conveyor pan drive stations and/or return stations for a scraper chain are provided. Each pan section includes a top strand delimited by lateral profiles and the conveyor base and a bottom strand for the scraper chain as well as receiving elements for a pan section connecting mechanism, which elements are disposed outside of the lateral profiles. A pan strand including a plurality of pan sections that are disposed behind each other is provided in the conveyor pan, which sections are hingeably coupled via a center swivel bearing disposed on the center longitudinal axis of the conveyor pan or the pan sections. The invention also relates to the pan sections with the center swivel bearings.

20 Claims, 4 Drawing Sheets

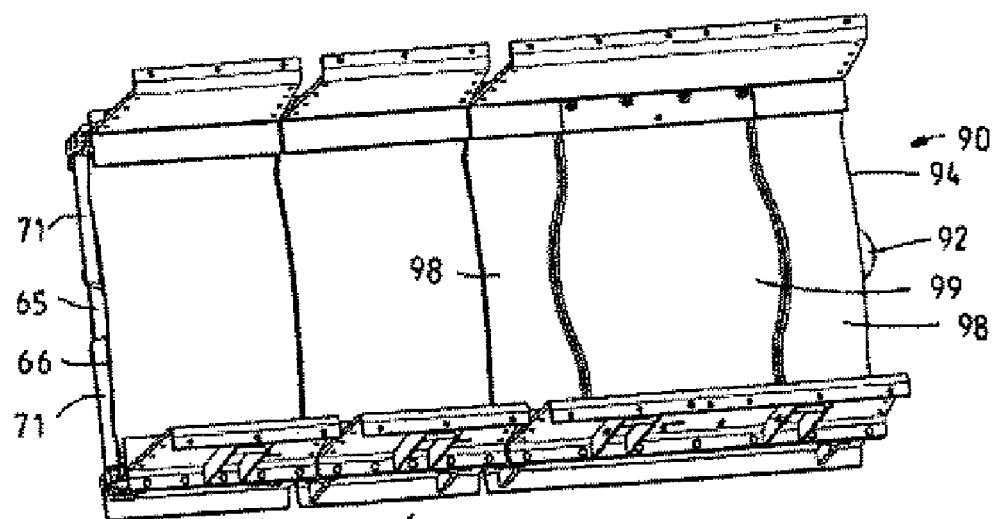
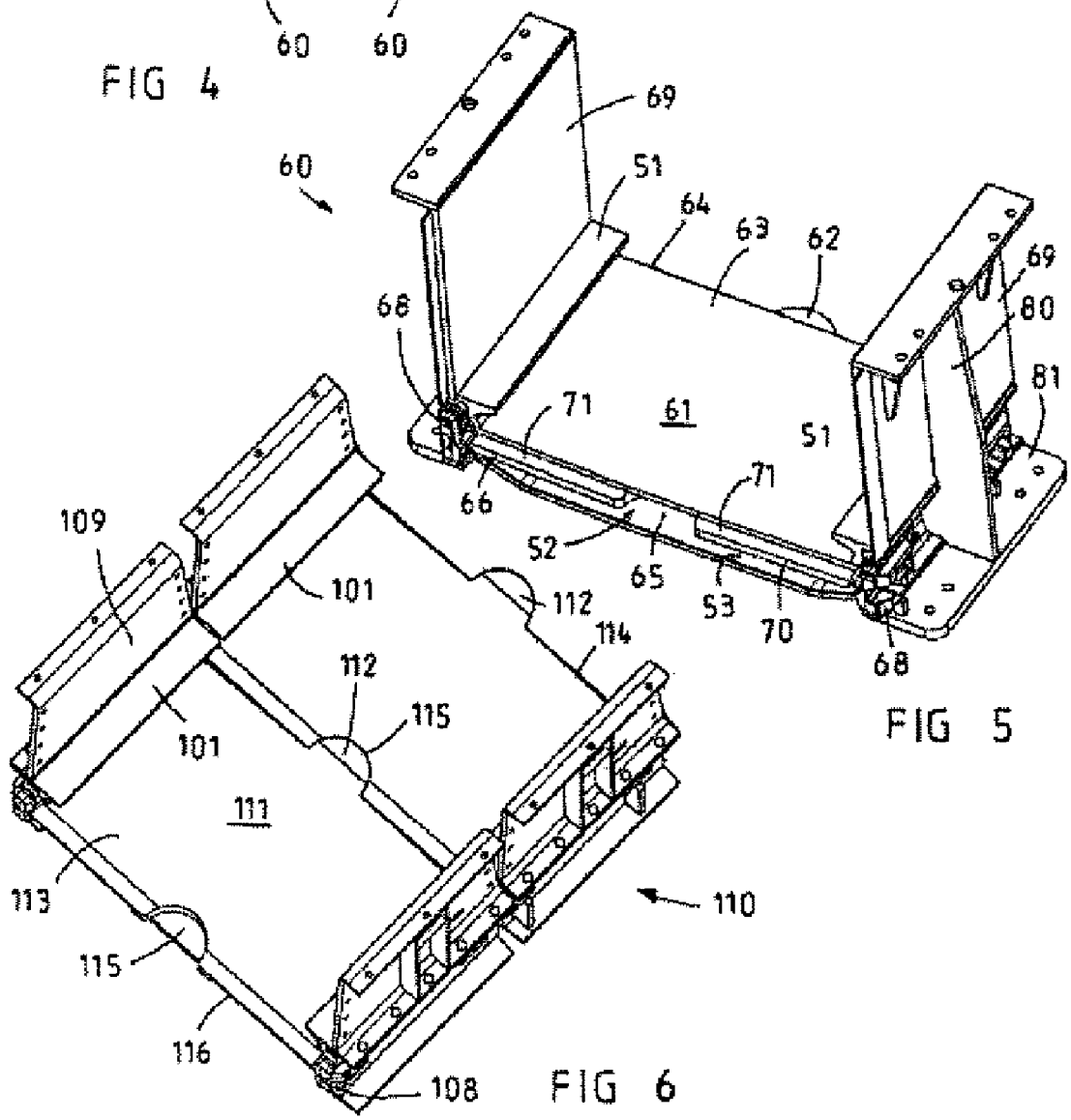
FIG 4
FIG 5
FIG 6

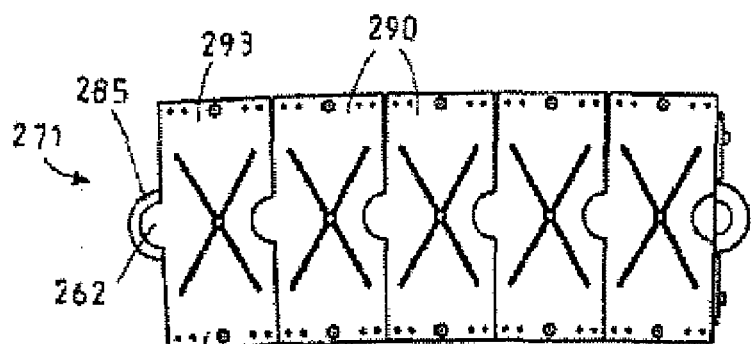
FIG 9
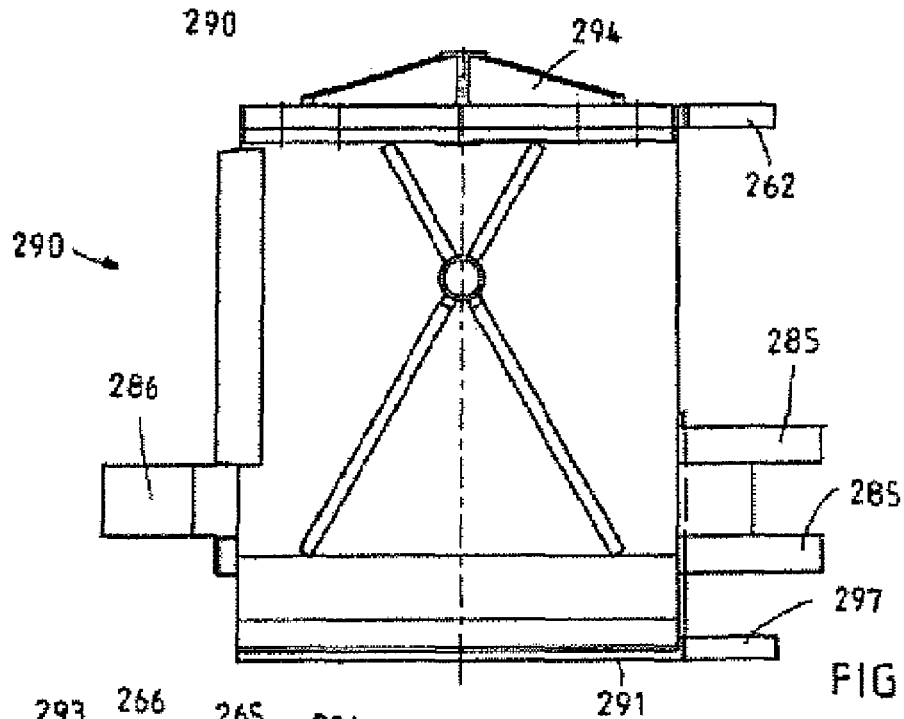
FIG 10
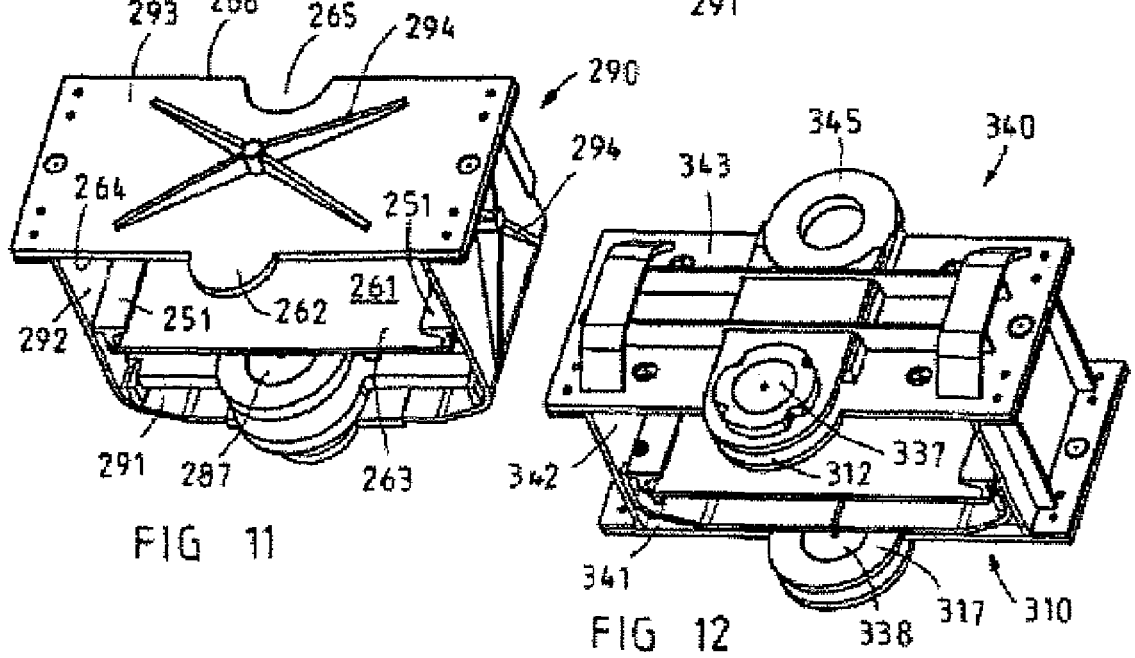
FIG 11
FIG 12

ENTRY CONVEYOR AND PAN SECTION FOR THE SAME

CROSS-REFERENCE TO RELATED APPLICATION

This application claims priority of German Patent Application No. 10 2006 025 517.8 filed on May 30, 2006.

BACKGROUND

The invention relates to an entry conveyor, particularly an entry transfer conveyor or crusher conveyor, comprising a conveyor pan formed by a plurality of pan sections that are hingeably connected to each other in a manner that guarantees tensile strength, at the two ends of which conveyor pan drive stations and/or return stations for a double scraper chain are provided, wherein each pan section comprises a top strand delimited by lateral profiles and the conveyor base and a bottom strand for the scraper chain as well as receiving elements for pan section connecting means, which elements are disposed outside of the lateral profiles. The invention furthermore relates to a pan section for corresponding entry conveyors, comprising a top strand, which is delimited by lateral profiles and a conveyor base, a bottom strand formed beneath the top strand and receiving elements for pan section connecting means on the outsides of the lateral profiles.

In the underground mining of minerals, particularly underground coal mining, downstream of the face conveyor provided in the mining longwall face an entry transfer conveyor is provided, in which generally a crusher is integrated, which reduces the previously mined mineral material to a size that can subsequently be transported by means of conveying belts. Both the face conveyor and the entry transfer conveyor are configured as scraper chain conveyors, which comprise robust double scraper chains with scraper blades connected to the chain links at regular intervals, which blades are used to transport the material. As a result of the mining progress that is made, the current position of the transfer station will change from a face conveyor to an entry conveyor. Since the crusher overall forms the heaviest unit, it is generally not moved or only in a linear fashion, and the crusher is frequently disposed in the vicinity of the return unit that is raised by means of a loading ramp, which unit at the same time forms a discharge station onto a downstream conveying belt or the like. Based on these circumstances, frequently position changes arise between the crusher on the one hand and the face entry transfer station on the other hand, which changes result in relatively high bending of the hingeably coupled pan sections of the entry conveyor. The hinged movement of the pan sections is guaranteed by means of pan section connecting elements, which are disposed on both sides of the lateral profiles and/or the conveyor pan and which connect adjoining pan sections of an entry conveyor in a manner that guarantees tensile strength, however at the same time allow the necessary hinged movement. Despite the short length in comparison with face conveyors, face-entry conveyors are subject to high chain forces and high chain tension, which can lead to disproportionate wear of the pan sections of the entry conveyor and/or the scraper chains that are used.

It is the object of the invention to create an entry conveyor and/or pan sections for an entry conveyor with improved operating behavior and reduced proneness to wear.

This object is achieved according to the invention in that on the entry conveyor in the conveyor pan a pan strand comprising a plurality of pan sections disposed behind each other is formed, which sections are hingeably coupled by means of a center swivel bearing that is provided on the center longitudinal axis of the conveyor pan and/or of the pan sections. Due to the center swivel bearing that is provided on the center longitudinal axis of the conveyor pan according to the invention, meaning a swivel bearing, which offers a hinged connection and moves the swivel point of adjoining pan sections to the center of the conveyor pan, the forces applied to the scraper chain belt are considerably reduced since the maximum bending between two adjoining pan sections is reduced by the center swivel bearing.

With the pan sections used until now in the state of the art, which sections are hingeably coupled to each other exclusively by the lateral pan section connecting means, bending automatically occurs between adjoining pan sections in a curve of the conveyor pan, which causes the sections to abut in the region of one of the two pan section connecting means and form a lateral swivel bearing, while on the opposite pan section connecting means the distance between the two pan sections is maximized. Consequently, the gap between two pan section connecting means continuously increases on the known pan sections from one pan section connecting means or from one lateral profile to the opposite lateral profile. This considerably varying bending of the pan sections in relation to their width, which bending occurs in curves of the face conveyor, resulted in the previously used pan sections in the fact that a double scraper chain routed in the conveyor pan experienced considerably more tension in the outer curve region of the chain strand than on the inner curve region of the chain strand, thus transmitting a larger portion of the conveying forces via the outer curve region of the scraper chain. The additional tension of the outer curve region of the chain belt relative to the inner curve region of the chain belt required the installation of a unit with higher drive output because additionally the tension forces must be overcome.

With the pan sections according to the invention, however, the elongation of the outer curve region of the chain belt relative to the inner curve region of the chain belt is considerably less due to the center swivel bearing, so that overall also the forces that are introduced in the chain links and consequently wear and tear are reduced. It is particularly advantageous that a pan strand is formed in the conveyor pan by a plurality of pan sections that are coupled to each other by means of center swivel bearings, so that the entire curve deviation can be substantially compensated for with relative uniformity across this pan strand comprising a plurality of pan sections. Even existing entry conveyors can therefore be converted to an entry conveyor according to the present invention in that a partial area of the pan sections of the existing entry conveyors is replaced with the pan sections according to the invention with center swivel bearings, while the remaining pan sections of the entry conveyor may continue to be or are made of regular pans with lateral swivel bearings.

According to an advantageous embodiment, in the conveyor pan a special pan section is formed at a distance from the pan strand comprising pan sections that are coupled to each other by means of center swivel bearings, which special pan section is in turn hingeably coupled to a pan section abutting thereon with a center swivel bearing that is disposed on the center line of the conveyor pan and/or the pan sections. The pan strand comprising the plurality of pan sections is consequently associated with an additional swivel bearing in the conveyor pan, which bearing enables counter-swiveling in a particularly simple manner, which in turn has the advantage that the swivel angles also on this single special pan section are less than in generic pan sections. Alternatively, at a distance from the first pan section a second pan section comprising a plurality of pan sections disposed behind each other may be formed, which sections in turn are hingeably coupled to each other by means of a swivel bearing disposed on the center longitudinal axis. It may also be sufficient, however, to provide only a single pan strand with a plurality of, for example six to fifteen pan sections with center swivel bearings in the entry conveyor. It is expedient if between the first pan section and the second pan section or the special pan regular pan sections are provided, which are hingeably connected to each other in a manner that guarantees tensile strength exclusively by receiving elements for pan section connecting means, which elements are disposed outside of the lateral profiles. It is furthermore expedient if the swivel bearing transmits substantially all pressure forces occurring in the conveying system between the abutting face ends of adjoining pan sections. For this purpose, it is advantageous if the swivel bearing at the same time effects good support for adjoining pan sections.

The invention is achieved even with a single pan section in that it comprises a swivel bearing formed at the center between the pan section connecting means or at the center between the lateral profiles to establish a hinged coupling of adjoining pan sections in the region of the center longitudinal axis of the individual pan sections or the conveyor pan formed by them.

According to an advantageous embodiment, the swivel bearing may be formed by projections on a conveyor base end and recesses on the opposite conveyor base end or the swivel bearing is established by the interaction of corresponding projections and recesses. Of course it is understood that on an entry conveyor the projection of a preceding pan section interacts with a recess in the conveyor base of the following pan section or vice versa. In an alternative embodiment, the top strand may be formed of an exchangeable trough, which can be inserted detachably in the pan section and is supported on an intermediate base formed between the two side walls of the pan sections, wherein the intermediate base on one base end may be provided with a projection and on the opposite base end with a recess for forming the swivel bearing. Furthermore, both the conveyor base and the intermediate base may be provided with appropriate swivel bearings.

Also with a fixed top strand, a pan section according to the invention may have an intermediate base on which the swivel bearing elements forming the swivel bearing, such as particularly the projection and the recess, are formed. To offer advantageous support of adjoining pan sections on the center swivel bearing, it is advantageous if the intermediate base comprises a center cross-member or the like, on which the recess is formed and which forms the projection for the swivel bearing. The swivel bearing may extend across a large depth, without excessively exceeding the total weight of the pan section. If it also advantageous if the intermediate base on an intermediate base edge is provided with an overlapping tongue for engaging in an overlapping taper of the opposing intermediate base edge.

Finally, providing center swivel bearings is also advantageous when the pan sections are configured as the ramp elements of a loading ramp, which ramp elements may then comprise the swivel bearing in the ramp element base or in the ramp element cover plates. In this embodiment, the center, swiveling coupling of adjoining pan sections is not established by means of the elements of the pan sections that form the conveyor pan, but instead by those elements that form the ramp construction. When configuring the pan sections as ramp elements for a loading ramp, it is particularly advantageous when the swivel bearing is formed by semi-circular overlapping projections on the ramp element base ends or on the ramp element cover plate ends, which at the same time serve or may serve the vertical support of the ramp elements against each other and preferably alternately engage in each other for the vertical support of the ramp elements.

In all embodiments, the swivel bearing may preferably comprise or be made of a semi-circular projection on one base end and a semi-circular recess on the opposing base end, which ends preferably have a relatively large contact region with each other in order to transmit all pressure forces present in the system between pan sections disposed behind each other. To minimize the chain elongation as a result of curves in the entry conveyor, it is particularly advantageous if the edges of the bases comprising the swivel bearings extend on both sides of the recess and/or of the projection at an angle toward the lateral profiles, so that the opposing, wedge-shaped widening edges substantially delimit the maximum swivel angle between two pan sections.

It is expedient if walls are mounted on both sides of the lateral profiles, which walls tower beyond the top strand in order to be able to transport also excavated material on the entry conveyor. It is also advantageous if at least one of the drive stations or return stations is configured such that it can be tensioned by means of tensioning cylinders. The tensioning cylinders may then advantageously be associated with pressure sensors, the signals of which are fed, for example, to a control unit for the tensioning cylinders and/or a monitoring device, to detect excessive bending within the entry conveyor.

Further advantages and embodiments of an entry conveyor according to the invention or the pan sections used for the same will be apparent from the description provided hereinafter of exemplary embodiments shown in schematic illustrations in the figures, wherein:

BRIEF DESCRIPTION OF THE DRAWINGS

FIG. 4 is a perspective top view of three pan sections according to the first embodiment that are connected to each other;

FIG. 5 is a perspective detailed view of an individual pan section according to FIG. 4;

FIG. 6 are two pan sections according to the second embodiment that are connected to each other;

FIG. 9 is a top view of several pan sections according to a fourth embodiment that are connected to each other and configured as ramp elements for a loading ramp;

FIG. 10 is a side view of a single pan section according to the fourth embodiment;

FIG. 11 is the pan section according to FIG. 10 in a perspective view; and

FIG. 12 is a pan section according to a fifth embodiment for a loading ramp.

DETAILED DESCRIPTION

Figure 1:
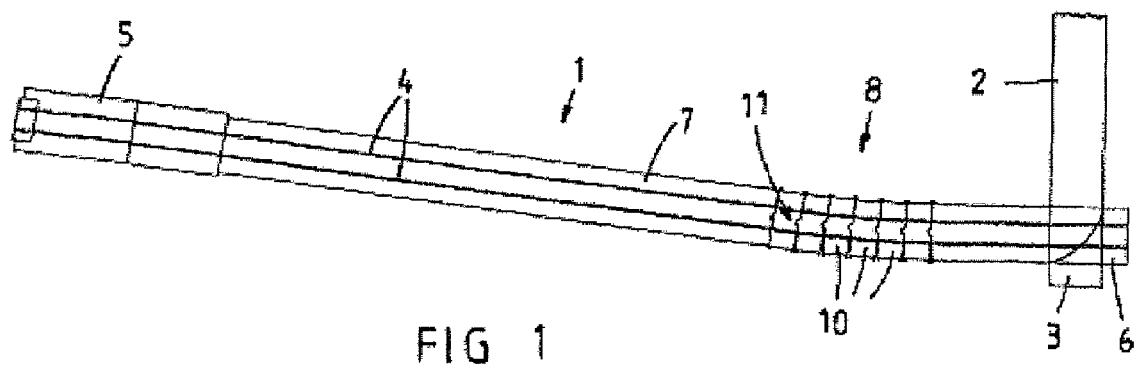
FIG. 1 is a schematic diagram of an entry conveyor according to the invention according to a first embodiment.

FIG. 1 shows a highly simplified schematic illustration of an entry conveyor 1 configured as a face-entry transfer conveyor, as it can be used in underground mining particularly for mining coal. The material that is mined with a face conveyor in a longwall mining face, which is not shown in detail, is discarded onto the entry conveyor 1 on a special pan configured as a cross-frame 3, wherein both the face conveyor 2 and the entry conveyor 1 are designed as double center scraper chain conveyors with two chain strands 4 of a double center scraper chain, which strands for the entry conveyor 1 are only illustrated schematically. The two chain strands 4 of the scraper chain illustrated here run in the top strand of a conveyor pan 7 from the cross-frame to the drive station 5, which is formed by a plurality of regular pan sections known to the person skilled in the art, which sections are not shown in detail and are designed identical to each other. The two chain strands 4 are redirected in the drive station 5, which is disposed on one end of the entry conveyor 1, as well as on the return station 6, which is disposed on the opposite end and which may likewise be configured as a drive station, in order to run between the stations 5, 6 as the slack side in the bottom strand or as conveyor side in the top strand and discharge material onto a downstream conveying belt or the like, which is not shown. The entry conveyor 1 is preferably associated with a crusher, which is not shown and which may be used to crush the mined material in the known fashion.

FIG. 1 shows that the drive station 5 is provided on one end of the entry conveyor not perpendicularly but instead obliquely relative to the return station 6. To be able to compensate for this positional deviation in a particularly advantageous manner, without subjecting the two chain strands 4 to varying chain elongations or chain tension due to the curve developing in the entry conveyor 1, in the entry conveyor 1 a pan strand 8 with eight pan sections 10 disposed behind each other is provided, wherein compared to other regular pan sections, which form the conveyor pan 7 and are not shown in detail, these pan sections 10 have the characteristic according to the invention that adjoining pan sections 10 are coupled to each other by means of the center swivel bearing 11 disposed on the center longitudinal axis of the conveyor pan 7.

Figure 3:
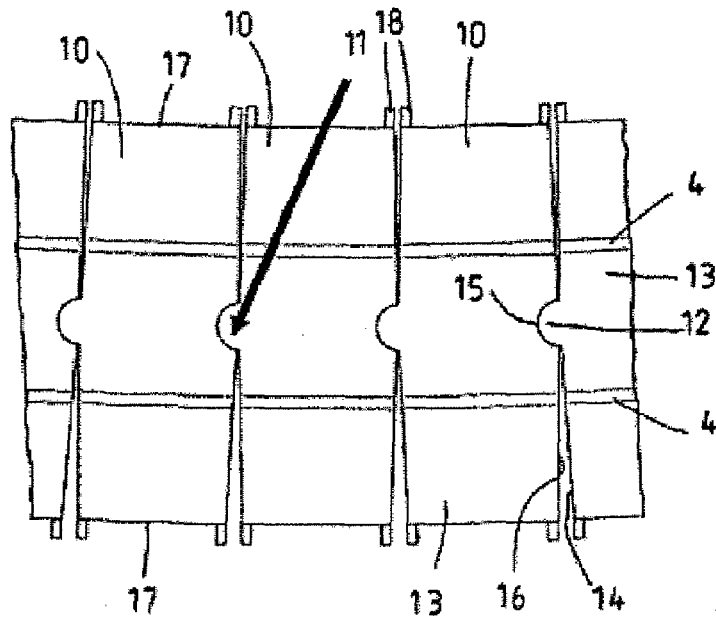
FIG. 3 is a schematic illustration of the hinged mounting using center swivel bearings on several adjoining pan sections.

The schematic illustration of the pan sections 10 with the center swivel bearing 11, which sections are provided behind each other, is also shown in FIG. 3. A projection 12, which in the schematic illustration according to FIG. 3 is formed, for example, on the front edge 14 of the conveyor base 13 of the pan sections 10, engages at the center between the two chain strands 4 and at the center between the two lateral boundaries of the individual pan sections 10 on the pan sections 10 in a correspondingly congruently shaped recess 15 on the opposite edge 16 of the conveyor base 13 of the next pan section 10. At the same time, as the schematic illustration according to FIG. 3 also shows, both edges 14, 16 extend laterally from the projection 12 or laterally from the recess 15 obliquely to the center longitudinal axis of the pan sections 10, so that a steadily widening gap towards the lateral profiles between the edges 14, 16 of adjoining pan sections 10 develops on both sides of the swivel bearing 11, at least when the two adjoining pan sections 10 do not compensate for a bending curve of a conveyor pan of the entry conveyor. The schematic illustration according to FIG. 3 shows a conveyor pan 7 with a slight upward curvature. The gap between the edges 14, 16 is therefore slightly larger below the swivel bearing 11 than above the swivel bearing 11 in the illustration according to FIG. 3. The maximum gap dimension, however, is considerably smaller than that found in regular pan sections, which can only support each other on the lateral boundaries of the pan sections 10 by means of lateral swivel bearings instead of a center swivel bearing 11. The schematic illustration according to FIG. 3 also indicates receiving elements 18 for pan section connecting means on both lateral boundaries 17 of the pan sections 10, respectively, to which adjoining pan sections 10 can be coupled relative to each other at least in the vertical direction in a manner that guarantees tensile strength.

Figure 2:
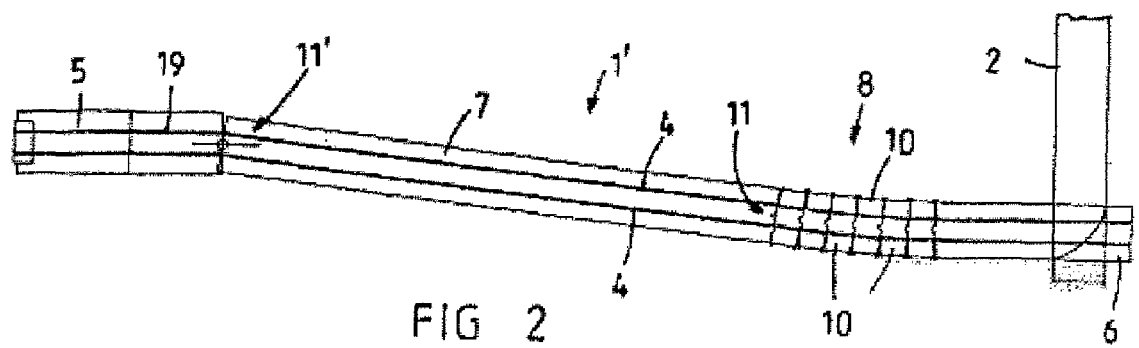
FIG. 2 is a schematic diagram of an entry conveyor according to the invention according to a second embodiment.

FIG. 2 shows a slightly modified embodiment of an entry conveyor 1' according to the invention. Here as well, a pan strand 8 according to the invention is formed by a plurality of pan sections 10, which are hingeably coupled to each other between the two chain strands 4 by means of center swivel bearings 11. Unlike the first embodiment, a special pan section 19 is provided downstream of the further conveyor pan 7 formed by means of regular pan sections, which special pan section is coupled to the regular pan section downstream of the special pan section 19 by means of a further center swivel bearing 11. As a result of this configuration, in the face conveyor 1' two swivel bearings 11 or 11' are formed on two locations that are spaced from each other, wherein one swivel bearing is made of a plurality of short pan sections 10 with center swivel bearings 11 and the other swivel bearing 11' is made of a single center swivel bearing 11', so that larger angular deviations can be compensated for without excessive chain elongation and in particular also an S-curve shape of a face conveyor 1' does not result in disadvantageous chain elongation or chain tension of the chain strands 4.

FIGS. 4 and 5 show in detail the inventive pan sections 60 according to a first embodiment. In the illustrated pan strand 58 according to FIG. 4, two identical pan sections 60, the length of which is relatively short and preferably corresponds only to 50% of the length of regular pans, are connected to an inspection pan section 90, which is likewise configured in accordance with the invention. The pan sections 60 as well as the inspection pan 90 comprise a top strand 61 in the familiar fashion, which is formed by means of a conveyor base 63 as well as two lateral profiles 51 connected to the conveyor base 63 to offer lateral guidance to the scrapers of the scraper chain, which are not shown. Beneath the top strand 61, the pan sections 60 or 90 have a bottom strand 52, which is delimited towards the bottom by a bottom strand plate 53 for guiding the returning scraper chain including the scrapers connected thereto. The pan section 60 and the pan section 90 are provided with an intermediate base 70 beneath the conveyor base 61, respectively, which intermediate base forms a reinforced frame construction at least in conjunction with the bottom strand base 53 as well as the side elements provided on either side of the lateral profiles 51. On the outsides of these side elements, close to the front edge 66 and the rear edge 64 of the pan section 60, receiving pockets 68 are provided, in which preferably toggle pins with toggle heads can be inserted to establish a connection of adjoining pan sections 60 or 90 that guarantees tensile strength. Above the side elements, side walls 69 extend upwardly, which are supported on the frame construction by means of supporting braces 80 and a base plate 81.

In order to form a swivel bearing according to the invention for the pan sections 60 in the center of the pan sections or on the center longitudinal axis of a conveyor pan formed with the pan sections, the intermediate base 70 on the one edge 66 of the pan sections 60 has a semi-circular recess 65 and on the other edge 64 again a semi-circular projection 62 that can be inserted with precise fit in the recess 65. The length and size of the projection 62 has been adjusted such that it rests across a large surface on the boundary surface of the recess 65 in the assembled state of two pan sections 60, so that pressure forces in the longitudinal direction of a conveyor pan can be absorbed or transmitted via the projections 62 and the recesses 65 forming the swivel bearing. On the pan sections 60 or 90, all forces of the swivel bearing are introduced in the intermediate base 70. To ensure that in the assembled state of a plurality of pan sections 60 no nutty slack can drop into the bottom strand, regardless of the bending angles, due to the center swivel bearing, the intermediate base 70 with overlapping tongues 71 protrudes beyond the front edge of the conveyor base 61, while the intermediate base on the opposite edge has overlapping tapers that are accordingly offset toward the back. As a result of this mutual overlapping of the conveyor base 61 and the intermediate base 70, the bottom strand 52 is completely covered and protected from entering nutty slack, even if adjoining pan sections while utilizing the full degree of freedom provided by the center swivel bearing are disposed obliquely in relation to each other such that the edges 64, 66 of adjoining pan sections on one side of the recess 65 and projection 62 come in contact, while on the other side a swivel gap develops.

The assembled state of a plurality of pan sections is shown in FIG. 4 with the two connected pan sections 60 as well as the pan section 90 connecting thereto. Also the pan section 90 configured as the inspection section has a recess, which is not shown, as well as a projection 92 on the edge 94. Therefore, also the inspection section 90 can be used to form a center swivel bearing at the center of the longitudinal axis of the conveyor pan with a downstream pan section, which is preferably made of a further pan section 60. Unlike the pan section 60, however, the pan section 90 has the same length as a regular pan section and in addition it has a removable trough section 99 between two fixed trough sections 98 provided close to the edges, which the person skilled in the art basically knows for regular pans that are configured as inspection pans.

The pan section 110 according to a second embodiment shown according to FIG. 6 differs from the pan section according the previous embodiment in that the projection 112 as well as the recess 115 are not provided on an intermediate base, but directly on the conveyor base 113, which delimits the top strand 111 from the bottom strand. The lateral profiles 101 are fixed to the conveyor base 111 and at the same time with their outsides they may also form the side elements of the pan section 110, on which then, for example, the upwardly extending walls 109 as well as the receiving pockets 108 for the pan section connecting means (for example toggle pins, which are not shown) are provided.

Figure 7:
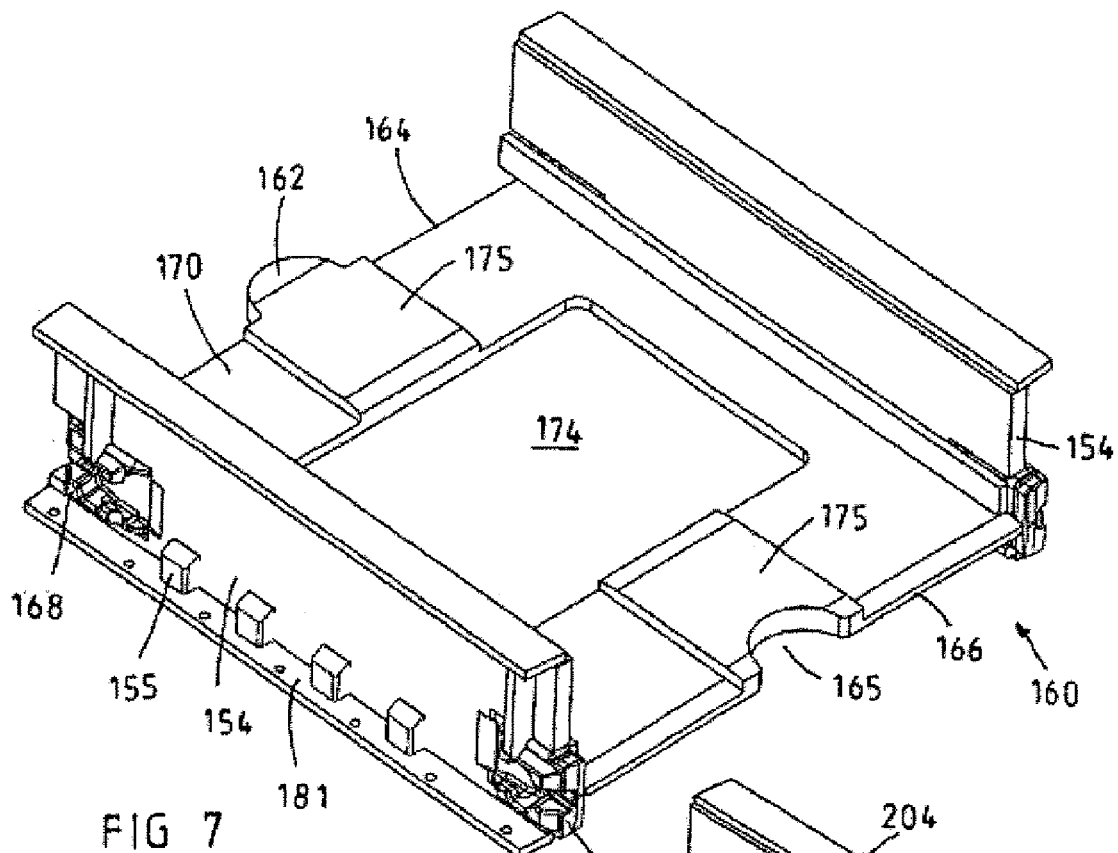
FIG. 7 is a pan section according to a third embodiment, configured as an inspection pan section.

According to FIG. 7, only the base frame of an inventive pan section 160 according to a third embodiment is shown, since the pan section 160 is provided with an exchangeable trough, which is not shown, as the top strand, which comprises the conveyor base as well as the lateral profiles welded thereon. The base frame of the pan section 160 has two side elements 154, which extend on both sides down to the base plates 181 and are supported there by additional, in this example rectangular, supporting noses 155 and are stabilized in their vertical position. In the side elements 154, in the vicinity of the two end edges 166 and 164 of the base frame of the pan section, receiving pockets 168 for toggle pins as the pan section connecting means are inserted. The two side elements 154 are connected to each other by means of an intermediate base 170, which has an inspection orifice 174 at the center, which opening is closed when the exchangeable trough is closed by means of a locking plate engaging in the inspection orifice 174, which plate is used to anchor the exchangeable trough to the base frame with positive fit. On the intermediate base 170, a center cross-member 175 is provided, which is made, for example, of a thicker region or welded-on plates, build-up welds or the like and which in the center region of the pan sections 160 ensures considerable reinforcement of the intermediate base 170. The center cross-member 175 is interrupted by the inspection orifice 174. At the edge 164 of the intermediate base 170 in turn a projection 162 is provided and on the edge 166 a recess 165 is provided, which are used to form the center swivel bearing. The center cross-member 175 has a width that is greater than the widest dimension of the projection 162 or the recess 165, so that both the semi-circular projection 162 and the semi-circular recess 165 with their entire boundary surfaces are provided in the region of the reinforcement of the intermediate plate 170 by the intermediate cross-member 175. The intermediate cross-member 175 therefore not only increases the depth of the contact surface between the projection 162 and the recess 165, but at the same time ensures that shear forces are introduced much better in the intermediate base 170 and thus in the entire pan section 160. However, since the thicker region of the intermediate base 170 is limited to a narrow center cross-member 175 in comparison with the total width of the pan section 160, this increases the total weight of a pan section 160 only insignificantly.

Figure 8:
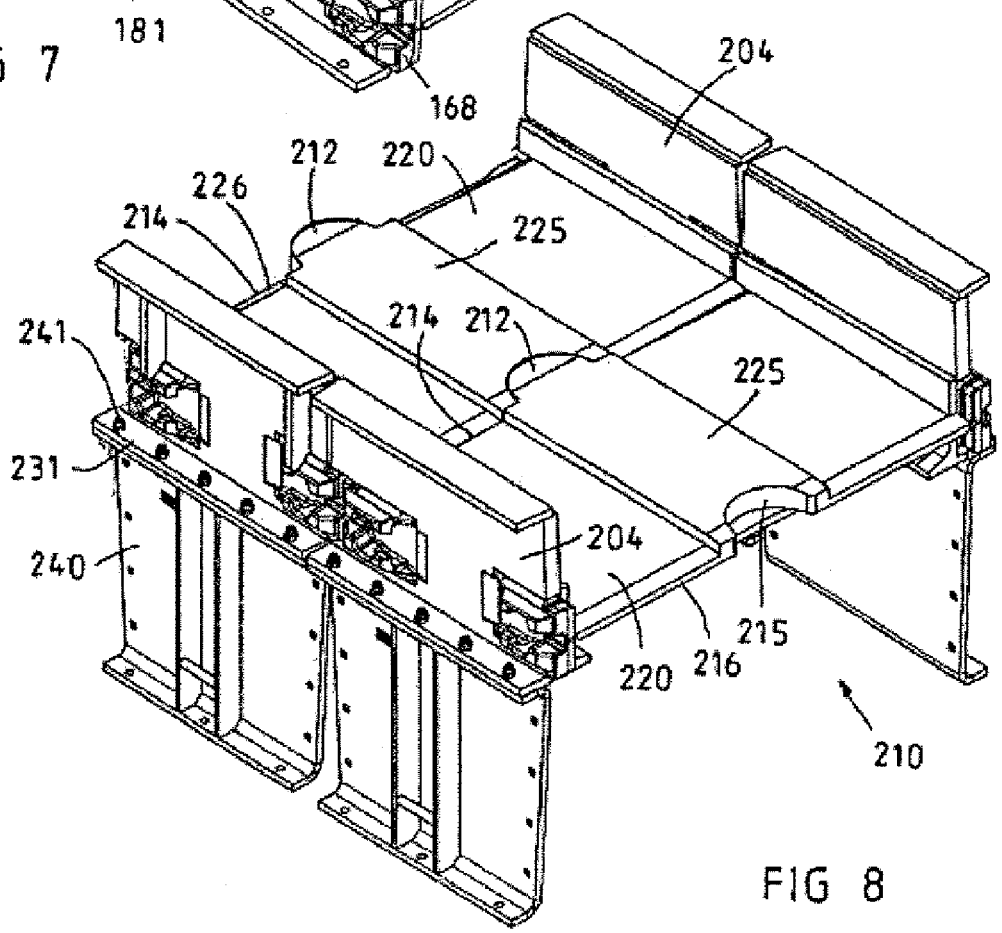
FIG. 8 are two further pan sections according to a third embodiment that are connected to each other.

FIG. 8 shows one embodiment of a pan section 210, in which like in the previous embodiment an intermediate base 220 is provided with a center cross-member 225, which has the recess 215 on one edge and the projection 212 on the opposite edge. The projection 212 and recess 215 extend across the thickness of the center cross-member 225. While the pan sections 210 are provided with the exchangeable trough, they do not form an inspection trough, but instead the center cross-member 225 extends from one edge 216 to the other edge 214 continuously. Downwardly extending support plates 240 are screwed to the base strips 231 laterally projecting from and welded to the side elements 204 of the pan sections 210 in order to form a loading ramp in conjunction with the pan sections 210, which ramp can be supported by a further rack or optionally by the floor of an underground longwall face. The base strips 231 are provided with a plurality of bores for fastening screws 241 to screw on the support plates 240. The pan sections 210 are again considerably shorter than the pan section 160 shown according to FIG. 7 and preferably are only half as long as regular pan sections in order to achieve good curvature across a short pan strand comprising a plurality of pan sections 210. At the rear edge 214 of the intermediate bases 220 or pan sections 210, again overlapping tongues 221 are provided, which may be used to prevent nutty slack or the like from dropping into a bottom strand beneath the intermediate base 220.

FIG. 9 to 11 show an embodiment for pan sections 260, which can be used to construct a curved, self-supporting ramp construction, as is shown in a schematic illustration according to FIG. 9. The pan sections 260 are received or integrated in ramp elements 290 or are an integral part of the corresponding ramp elements 290. Each ramp element 290 comprises a ramp element base 291, in this example with integrally formed or bent, upwardly protruding side elements 292, which are screwed to a ramp element cover plate 293. Together with the side elements 292 and the ramp element cover plate 293, the ramp element base 291 forms a receiving box for the actual pan sections 260, which for this purpose are installed or integrated in the ramp elements 290. In FIG. 11, of the pan sections 260 the top strand 261 with the conveyor base 263 and the two lateral profiles 251 are depicted well.

The ramp element cover plate 293 and the side elements 292 are rigidly reinforced by means of supporting crosses 294. The ramp element cover plate 293 is provided on one edge 266 with a recess 265 and on the opposite edge 264 with a semi-circular projection 262, which in the region of the ramp element cover plate form an upper swivel bearing 271, which is provided at the center and on the center longitudinal axis of the loading ramp. In addition, also in the ramp element base 291 or in a construction on the base, two legs 285 are provided on one edge and one eye 286 on the opposite side of the ramp elements 290, which in the assembled state of adjoining ramp elements 290 mesh with each other such that a swivel pin 287 can be inserted through aligned eyes in the legs 285 and the eye 286. Since the two horizontally aligned legs 285 form a horizontal double bearing, which receives the eye 286 at the center, this lower swivel bearing at the same time provides vertical support to the ramp elements 290 against each other. The center lower swivel bearing at the same time promotes a swiveling of adjoining pan sections toward each other in the inventive manner. FIGS. 10 and 11 show well that in addition a further projection 297 is provided on one face side of the ramp element base 291, which projection engages in a corresponding recess on the opposite face side of the ramp element base 291, so that on the ramp elements 290 a total of three swivel bearings having varying heights are formed, which guarantee the center swivability of the ramp elements 290 toward each other.

FIG. 12 shows a ramp element 340 according to a further embodiment. Also the ramp element 340 serves the creation of a self-supporting loading ramp for an entry transfer conveyor and on the inside of the ramp element again a pan section 310 is inserted or integrated. Unlike the previous embodiment, the ramp element 340 is formed by a level ramp element base 341 and a level ramp element cover plate 343, which are screwed together by means of C-shaped intermediate plates 342. Both on the ramp element base 341 and on the ramp element base plate 343, on one face side projections 312 or 317 having two horizontal, ring-shaped flanges forming a double bearing are provided, in which flanges in turn a substantially ring-shaped projection 345 comprising an eye can be inserted such that a first swivel pin 337 can be inserted through the double swivel bearing 312 and the bearing eye 345 and a second swivel pin 338 can be inserted through the double swivel bearing 317 and the associated swivel eye. This plurality of swivel bearings configured at the center of the ramp elements 310 guarantees on one hand that adjoining ramp elements 340 can be bent and at the same time the adjoining ramp elements 340 are connected to each other and supported against each other in the vertical direction such that a plurality of ramp elements 340 can be combined into a self-supporting loading ramp.

For the person skilled in the art, numerous modifications will be apparent from the above description, which shall all be covered by the scope of protection of the attached claims. It is obvious that the design variants described for the individual exemplary embodiments can also be combined with each other. The swivel bearings could also be formed by means of elements other than recesses and projections and comprise swivel journals or swivel pins.

The invention claimed is:

1. An entry conveyor, comprising:
a conveyor pan formed by a plurality of hingeably connected pan sections, the conveyor pan having a first end and a second end;
at least one of a first conveyor pan drive station or a first return station for a scraper chain provided at the first end of the conveyor pan;
at least one of a second conveyor pan drive station or a second return station for the scraper chain provided at the second end of the conveyor pan, wherein
each pan section includes a top strand delimited by lateral profiles and a conveyor base, a bottom strand for the scraper chain, and a plurality of receiving elements for pan section connecting elements disposed outside of the lateral profiles; and
a pan strand comprising a plurality of pan sections that are disposed behind each other is provided in the conveyor pan, the plurality of pan sections being hingeably coupled via a swivel bearing disposed on a center longitudinal axis of at least one of the conveyor pan or the pan sections.

2. The entry conveyor of claim 1, further comprising a special pan section provided in the conveyor pan at a distance from the pan strand, the special pan section being hingeably coupled to an adjacent pan section via a swivel bearing disposed on the center longitudinal axis of at least one of the conveyor pan or the pan sections.

3. The entry conveyor of claim 1, wherein
the pan strand is a first an strand; and
a second pan strand including a plurality of pan sections disposed behind each other is provided at a distance from the first pan strand, the pan sections being hingeably coupled via at least one swivel bearing disposed on the center longitudinal axis of at least one of the conveyor pan or the pan sections.

4. The entry conveyor of claim 3, wherein
at least one of the special pan, the drive station or the return station regular pan sections are provided between the first pan strand and the second pan strand and are hingeably connected to each other to guarantee tensile strength via pan section connecting elements disposed outside of the lateral profiles.

5. The entry conveyor of claim 1, wherein
the swivel bearing is located between abutting end faces of adjoining pan sections; and
the swivel bearing is adapted for transmitting substantially all pressure forces.

6. A pan section for entry conveyors, comprising:
a top strand delimited by lateral profiles and a conveyor base;
a bottom strand configured beneath the top strand; and
a plurality of receiving elements for pan section connecting elements located outside of the lateral profiles,
wherein a swivel bearing is configured at a center between the pan section connecting elements or at a center between the lateral profiles, the swivel bearing being adapted for hingeable coupling of adjoining pan sections.

7. The pan section of claim 6, wherein
the swivel bearing is formed by a projection on a conveyor base end and a recess on an opposing conveyor base end.

8. The pan section of claim 6, wherein
the top strand includes an exchangeable trough;
the exchangeable trough is adapted for detachable insertion in the pan section and is supported by an intermediate base; and
the intermediate base includes a projection on a first base end and a recess on a second base end to form a swivel bearing.

9. The pan section of claim 6, further comprising an intermediate base, wherein
the swivel bearing is located on the intermediate base; and
the swivel bearing includes a projection and a recess.

10. The pan section of claim 9, wherein
the intermediate base includes one of a center cross-member or a thick center region;
the recess is provided on the center cross-member or the thick center region; and
the projection is formed on the center cross-member or the thick center region.

11. The pan section of claim 7, wherein the intermediate base is provided on an intermediate base edge with an overlapping tongue for engaging in an overlapping taper on an opposing intermediate base edge.

12. The pan section of claim 6, wherein the pan section is configured as a ramp element for establishing a loading ramp, the ramp element including a ramp element base and a ramp element cover plate; and a plurality of swivel bearing elements forming the swivel bearing are provided in at least one of the ramp element base or in the ramp element cover plate.

13. The pan section according to claim 12, wherein the swivel bearing is formed by semi-circular flanges located on at least one of the ramp element base or the ramp element cover plate, the flanges alternately engaging to provide vertical support to the ramp element.

14. The pan section of claim 6, wherein the swivel bearing includes at least one semi-circular projection located on a first base end, and at least one semi-circular recess located on a second base end.

15. The pan section of claim 14, wherein at least one of an edge of the base on both sides of the recess or an edge of the base on both sides of the projection extend obliquely to one of the lateral profiles or side elements.

16. The pan section of claim 6, wherein walls are mounted on both sides of the lateral profiles; and the walls project beyond the top strand.

17. The pan section of claim 6, wherein the pan section connecting elements are formed by toggle pins; and the receiving elements are formed by receiving pockets.

18. An entry conveyor, comprising:

a conveyor pan formed by a plurality of hingeably connected pan sections, the conveyor pan having a first end and a second end;

at least one of a first conveyor pan drive station or a first return station for a scraper chain provided at the first end of the conveyor pan;

at least one of a second conveyor pan drive station or a second return station for the scraper chain provided at the second end of the conveyor pan, wherein each pan section includes a top strand delimited by lateral profiles and a conveyor base, a bottom strand configured beneath the top strand for the scraper chain, a plurality of receiving elements for pan section connecting elements disposed outside of the lateral profiles, and a swivel bearing configured at a center between the pan section connecting elements or at a center between the lateral profiles, the swivel bearing being adapted for hingeable coupling of adjoining pan sections; and in the conveyor pan a pan strand comprising a plurality of pan sections that are disposed behind each other is provided, the plurality of pan sections being hingeably coupled via a swivel bearing disposed on a center longitudinal axis of at least one of the conveyor pan or the pan sections.

19. The entry conveyor according to claim 18, wherein at least one of the first conveyor pan drive station, first return station, second conveyor pan drive station, or second return station is adapted to be tensioned using tensioning cylinders.

20. The entry conveyor according to claim 19, wherein the tensioning cylinders are associated with pressure sensors; and the signals of the pressure sensors are fed to a control unit for the tensioning cylinders.

* * * * *